(12) United States Patent
Kawai (10) Patent No.: US 11,142,247 B2
(45) Date of Patent: Oct. 12, 2021

(54) SUBFRAME FOR VEHICLE

(71) Applicant: F-TECH INC., Kuki (JP)

(72) Inventor: Toru Kawai, Tochigi (JP)

(73) Assignee: F-TECH INC., Kuki (JP)

( * ) Notice: Subject to any disclaimer, the term of this patent is extended or adjusted under 35 U.S.C. 154(b) by 29 days.

(21) Appl. No.: 16/829,425

(22) Filed: Mar. 25, 2020

(65) Prior Publication Data

US 2020/0307698 A1 Oct. 1, 2020

(30) Foreign Application Priority Data

Mar. 29, 2019 (JP) .............................. JP2019-068056

(51) Int. Cl.
*B62D 21/11* (2006.01)
*B62D 21/03* (2006.01)
*B62D 21/15* (2006.01)

(52) U.S. Cl.
CPC .............. *B62D 21/11* (2013.01); *B62D 21/03* (2013.01); *B62D 21/155* (2013.01)

(58) Field of Classification Search
CPC ....... B62D 21/03; B62D 21/11; B62D 21/155
See application file for complete search history.

(56) References Cited

U.S. PATENT DOCUMENTS

| 6,109,654 A * | 8/2000 | Yamamoto | B62D 21/152 180/299 |
| 8,967,670 B2 * | 3/2015 | Mohrlock | F17C 13/084 280/782 |
| 9,010,849 B2 * | 4/2015 | Komiya | B62D 21/11 296/204 |
| 9,096,276 B2 * | 8/2015 | Komiya | B62D 21/155 |
| 10,239,560 B2 * | 3/2019 | Tomikuda | B62D 21/11 |
| 2011/0266785 A1 * | 11/2011 | Mildner | B62D 25/085 280/785 |
| 2020/0307703 A1 * | 10/2020 | Kawai | B62D 21/155 |
| 2020/0307704 A1 * | 10/2020 | Kawai | B62D 25/085 |
| 2021/0070365 A1 * | 3/2021 | O'Bannon | B62D 21/08 |
| 2021/0070366 A1 * | 3/2021 | Innami | B62D 21/11 |
| 2021/0070369 A1 * | 3/2021 | Innami | B62D 21/11 |

FOREIGN PATENT DOCUMENTS

| DE | 10352078 A1 * | 6/2005 | ............ B62D 21/11 |
| JP | 2009061879 A | 3/2009 | |

* cited by examiner

*Primary Examiner* — Laura Freedman
(74) *Attorney, Agent, or Firm* — Westerman, Hattori, Daniels & Adrian, LLP (57) ABSTRACT

In a vehicle subframe, a left coupling member is connected to a left front portion, a left connecting portion, and a lateral portion of the cross member in a left front coupling portion while covering the left connecting portion of the cross member in the width direction, and a right coupling member is connected to a right front portion, a right connecting portion, and the lateral portion of the cross member in the right front coupling portion while covering the right connecting portion of the cross member in the width direction.

4 Claims, 5 Drawing Sheets

SUBFRAME FOR VEHICLE

BACKGROUND OF THE INVENTION

The present invention relates to a vehicle subframe and particularly relates to a vehicle subframe that allows a driving source and the like to be mounted thereon, supports a suspension arm and the like, and is attached to a vehicle such as an automobile.

In recent years, various external-force application parts are attached to a subframe attached to a vehicle such as an automobile, which include mount-related parts for a power system, for example, an internal combustion engine and an electric motor, suspension-related parts such as a suspension arm and a stabilizer, and steering-related parts such as a steering gear box.

Therefore, the subframe is expected to be attached to the body of the vehicle in a form in which the strength and rigidity thereof are increased while the productivity and the like are improved.

Further, the subframe is expected to be deformed in a desired deformation mode, that is, to exhibit a required collision performance typically in frontal collision of the vehicle to which the subframe is attached, in order to appropriately distribute a kinetic energy applied to the vehicle at the time of the collision and absorb a portion of the kinetic energy.

Under these circumstances, Japanese Patent Publication No. 2009-61879 discloses a configuration related to a vehicle-body suspension device, which includes a subframe 2 suspended from a side member 1 with a plurality of attachment portions 11A to 11F and an arm member formed by a pair of an upper arm 3 and a lower arm 4 axially supported on both sides of the subframe 2. In this device, in order to transmit and distribute an external force input from the arm member to the subframe 2 to each of the attachment portions 11A to 11F, a coupling member 15 is provided in the subframe 2 configured by a U-shaped pipe 19 with a plurality of brackets attached thereto, and transmission pipes 37 and 38 are provided to connect the coupling member 15 and the attachment portions 11 to each other.

SUMMARY OF THE INVENTION

However, the studies of the present inventor have revealed that, although the configuration in Japanese Patent Publication No. 2009-61879 includes a configuration of transmitting and distributing the external force input from the arm member to the subframe 2 to each of the attachment portions 11A to 11F in order to improve the rigidity of attaching the arm member and further improve the torsional rigidity, this publication fails to disclose or suggest distributing the kinetic energy applied to the vehicle appropriately to allow a required collision performance to be exhibited in collision of the vehicle. Therefore, the configuration in this publication still has room for improvement from this viewpoint.

The present invention has been made as a result of the above studies and it is an object of the present invention to provide a vehicle subframe capable of appropriately distributing and transmitting a load in collision to exhibit a required collision performance while the strength and rigidity are increased.

In order to achieve the above object, a first aspect of the present invention provides a vehicle subframe attached to a vehicle body of a vehicle comprising: a cross member that extends in a width direction of the vehicle body, is arranged in a front-side portion of the vehicle body in a front-rear direction, allows a driving source that generates a driving force for driving the vehicle to be mounted thereon, and has a left front attachment portion to be attached to a left end in the width direction of the vehicle body and a right front attachment portion to be attached to a right end in the width direction of the vehicle body, in the front-side portion; a left side member that extends in the front-rear direction, is arranged in a left-side portion in the width direction, and has a left rear attachment portion to be attached to the left end in the width direction of the vehicle body in a rear-side portion in the front-rear direction; a right side member that extends in the front-rear direction, is arranged in a right-side portion in the width direction, and has a right rear attachment portion to be attached to the right end in the width direction of the vehicle body in the rear-side portion in the front-rear direction; a left coupling member that, to couple the cross member and the left side member to each other, has a left front coupling portion that is an end on a side close to the cross member and a left rear coupling portion that has a shorter length in the width direction than a length in the width direction of the left front coupling portion and is an end on a side close to the left side member; and a right coupling member that, to couple the cross member and the right side member to each other, has a right front coupling portion that is an end on the side close to the cross member and a right rear coupling portion that has a shorter length in the width direction than a length in the width direction of the right front coupling portion and is an end on a side close to the right side member, wherein the cross member has a lateral portion extending in the width direction, a left front portion located on a side of the lateral portion which is close to the left front attachment portion and extending in the front-rear direction, a right front portion located on a side of the lateral portion which is close to the right front attachment portion and extending in the front-rear direction to be opposed to the left front portion in parallel thereto, a left connecting portion connecting a left end in the width direction of the lateral portion and a rear end in the front-rear direction of the left front portion in a connection shape including a smoothly curved shape, and a right connecting portion connecting a right end in the width direction of the lateral portion and a rear end in the front-rear direction of the right front portion in a connection shape including a smoothly curved shape, the left coupling member is connected to the left front portion, the left connecting portion, and the lateral portion of the cross member in the left front coupling portion while covering the left connecting portion of the cross member in the width direction, and the right coupling member is connected the right front portion, the right connecting portion, and the lateral portion of the cross member in the right front coupling portion while covering the right connecting portion of the cross member in the width direction.

According to a second aspect of the present invention, in addition to the first aspect, the left side member has a left front end opposed to the left rear attachment portion in the front-rear direction, the right side member has a right front end opposed to the right rear attachment portion in the front-rear direction, the left coupling member is connected to the left front end of the left side member in the left rear coupling portion while covering the left front end in the width direction, and the right coupling member is connected to the right front end of the right side member in the right rear coupling portion while covering the right front end in the width direction.

According to a third aspect of the present invention, in addition to the first or second aspect, the left coupling member has a left supporting member that supports a left suspension member of the vehicle to overlap the left connecting portion of the cross member in the width direction when viewed in the front-rear direction, and the right coupling member has a right supporting member that supports a right suspension member of the vehicle to overlap the right connecting portion of the cross member in the width direction when viewed in the front-rear direction.

According to a fourth aspect of the present invention, in addition to any one of the first to third aspects, the left coupling member has a left attachment member in which a left intermediate attachment portion to be attached to the left end in the width direction of the vehicle body is arranged at an intermediate position in the front-rear direction to overlap the left connecting portion of the cross member in the width direction when viewed in the front-rear direction, and the right coupling member has a right attachment member in which a right intermediate attachment portion to be attached to the right end in the width direction of the vehicle body is arranged at an intermediate position in the front-rear direction to overlap the right connecting portion of the cross member in the width direction when viewed in the front-rear direction.

In the configuration according to the first aspect of the present invention, a vehicle subframe attached to a vehicle body of a vehicle includes a cross member that extends in a width direction of the vehicle body, is arranged in a front-side portion in a front-rear direction of the vehicle body, allows a driving source that generates a driving force for driving the vehicle to be mounted thereon, and has a left front attachment portion to be attached to a left end in the width direction of the vehicle body and a right front attachment portion to be attached to a right end of the vehicle body, in the width direction in the front-side portion, a left side member that extends in the front-rear direction, is arranged in a left-side portion in the width direction, and has a left rear attachment portion to be attached to the left end in the width direction of the vehicle body in a rear-side portion in the front-rear direction, a right side member that extends in the front-rear direction, is arranged in a right-side portion in the width direction, and has a right rear attachment portion to be attached to the right end in the width direction of the vehicle body in the rear-side portion in the front-rear direction, a left coupling member that, to couple the cross member and the left side member to each other, has a left front coupling portion that is an end on a side close to the cross member and a left rear coupling portion that has a shorter length in the width direction than a length in the width direction of the left front coupling portion and is an end on a side close to the left side member, and a right coupling member that, to couple the cross member and the right side member to each other, has a right front coupling portion that is an end on the side close to the cross member and a right rear coupling portion that has a shorter length in the width direction than a length in the width direction of the right front coupling portion and is an end on the side close to the right side member. The cross member has a lateral portion extending in the width direction, a left front portion located on a side of the lateral portion which is close to the left front attachment portion and extending in the front-rear direction, a right front portion located on a side of the lateral portion which is close to the right front attachment portion and extending in the front-rear direction to be opposed to the left front portion in parallel thereto, a left connecting portion connecting a left end in the width direction of the lateral portion and a rear end in the front-rear direction of the left front portion in a connection shape including a smoothly curved shape, and a right connecting portion connecting a right end in the width direction of the lateral portion and a rear end in the front-rear direction of the right front portion in a connection shape including a smoothly curved shape. The left coupling member is connected to the left front portion, the left connecting portion, and the lateral portion of the cross member in the left front coupling portion while covering the left connecting portion of the cross member in the width direction. The right coupling member is connected to the right front portion, the right connecting portion, and the lateral portion of the cross member in the right front coupling portion while covering the right connecting portion of the cross member in the width direction. Therefore, it is possible to appropriately distribute and transmit a load in collision to the left and right side members to exhibit a required collision performance while the strength and rigidity of the entire subframe are increased.

Further, in the configuration according to the second aspect of the present invention, the left side member has a left front end opposed to the left rear attachment portion in the front-rear direction, the right side member has a right front end opposed to the right rear attachment portion in the front-rear direction, the left coupling member is connected to the left front end of the left side member in the left rear coupling portion while covering the left front end in the width direction, and the right coupling member is connected to the right front end of the right side member in the right rear coupling portion while covering the right front end in the width direction. Therefore, it is possible to appropriately distribute and surely transmit a load (an impact) in collision to the left and right side member.

Furthermore, in the configuration according to the third aspect of the present invention, the left coupling member has a left supporting member that supports a left suspension member of the vehicle to overlap the left connecting portion of the cross member in the width direction when viewed in the front-rear direction, and the right coupling member has a right supporting member that supports a right suspension member of the vehicle to overlap the right connecting portion of the cross member in the width direction when viewed in the front-rear direction. Therefore, it is possible to increase the supporting strength and the supporting rigidity for the suspension members and to appropriately distribute and transmit a load in collision to the left and right side member.

In addition, in the configuration according to the fourth aspect of the present invention, the left coupling member has a left attachment member in which a left intermediate attachment portion to be attached to the left end in the width direction of the vehicle body is arranged at an intermediate position in the front-rear direction to overlap the left connecting portion of the cross member in the width direction when viewed in the front-rear direction, and the right coupling member has a right attachment member in which a right intermediate attachment portion to be attached to the right end in the width direction of the vehicle body is arranged at an intermediate position in the front-rear direction to overlap the right connecting portion of the cross member in the width direction when viewed in the front-rear direction. Therefore, it is possible to increase the attaching strength and the attaching rigidity of the subframe to the vehicle body and to appropriately distribute and transmit a load in collision to the left and right side member.

DETAILED DESCRIPTION OF THE PREFERRED EMBODIMENT

A vehicle subframe according to an embodiment of the present invention will be explained below in detail with reference to FIGS. 1 to 7. In the drawings, an x-axis, a y-axis, and a z-axis form a triaxial orthogonal coordinate system, and descriptions are made assuming the positive direction of the x-axis as a right direction, the positive direction of the y-axis as a front direction, and the positive direction of the z-axis as an upper direction. An x-axis direction is referred to as a width direction or a lateral direction, a y-axis direction is referred to as a front-rear direction, and a z-axis direction is referred to as a vertical direction in some cases.

Figure 1:
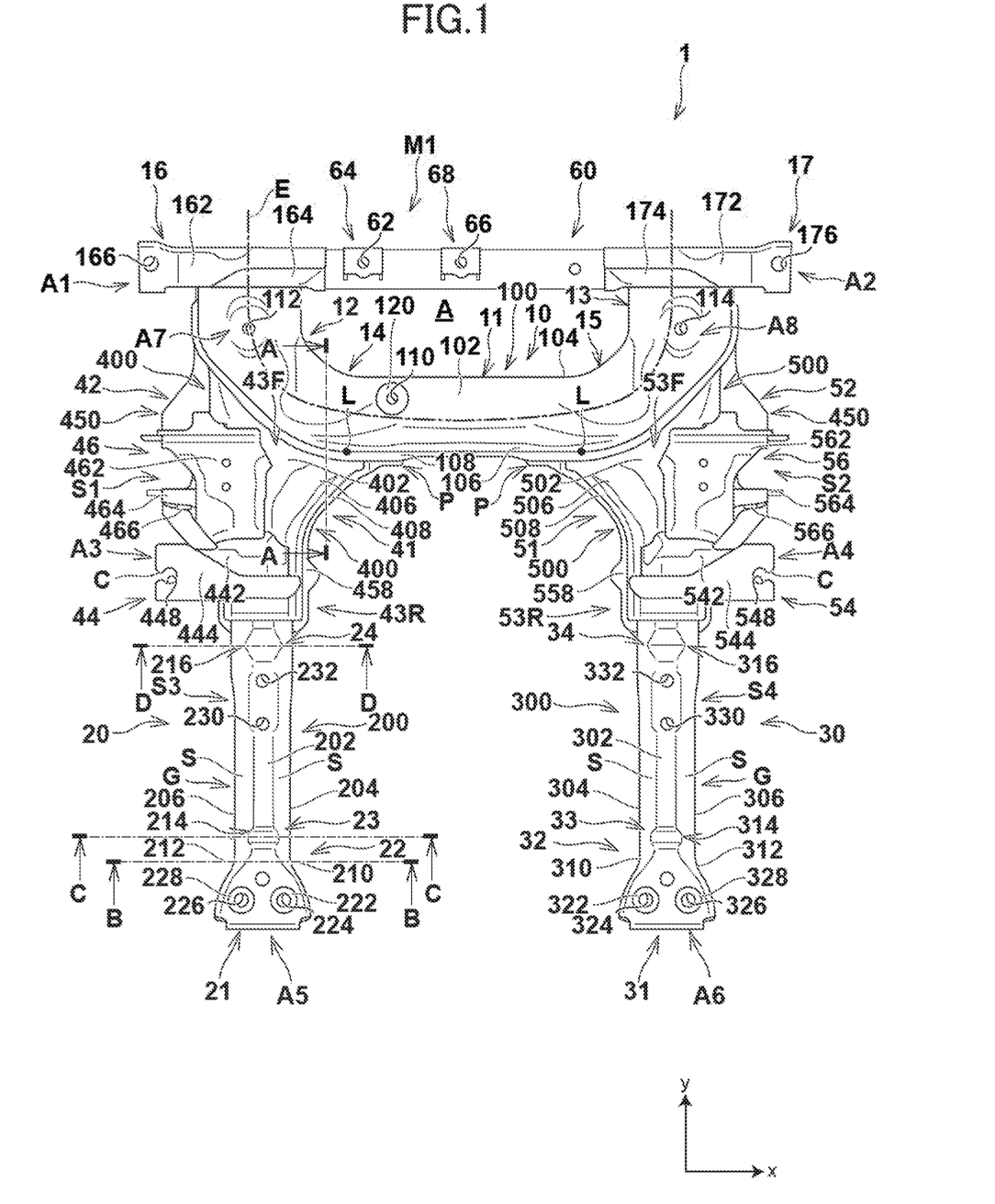
FIG. 1 is a plan view showing a configuration of a vehicle subframe according to an embodiment of the present invention.
Figure 2:
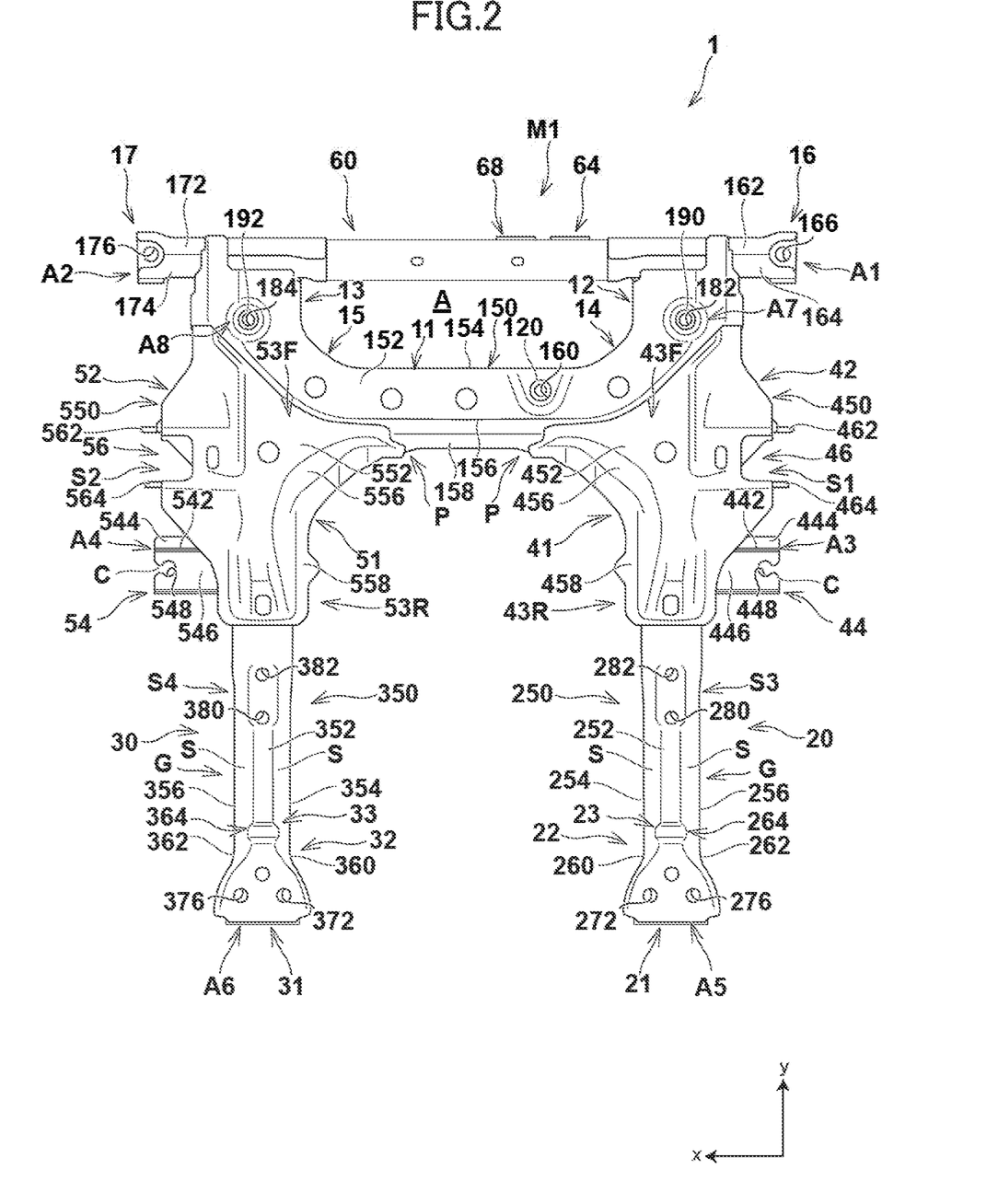
FIG. 2 is a bottom view showing the configuration of the vehicle subframe according to the embodiment.
Figure 3:
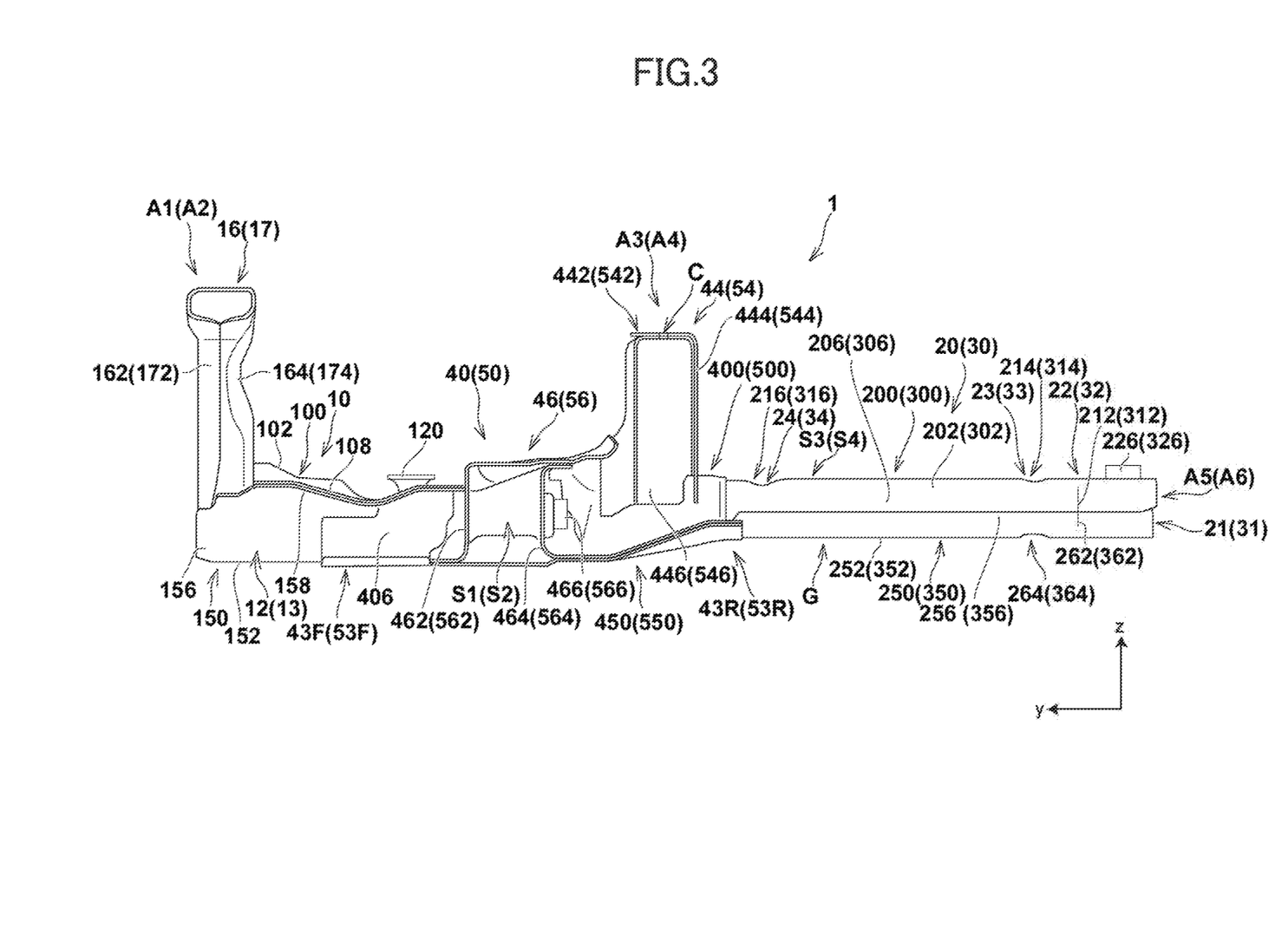
FIG. 3 is a left side view showing the configuration of the vehicle subframe according to the embodiment.
Figure 4:
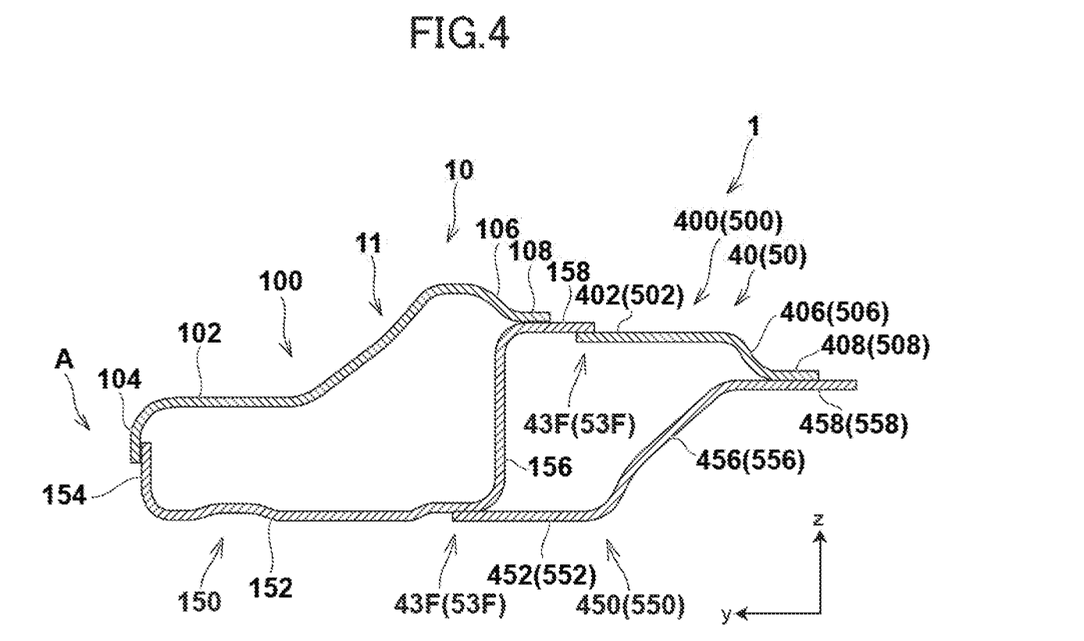
FIG. 4 is a cross-sectional view taken along a line A-A in FIG. 1.
Figure 5:
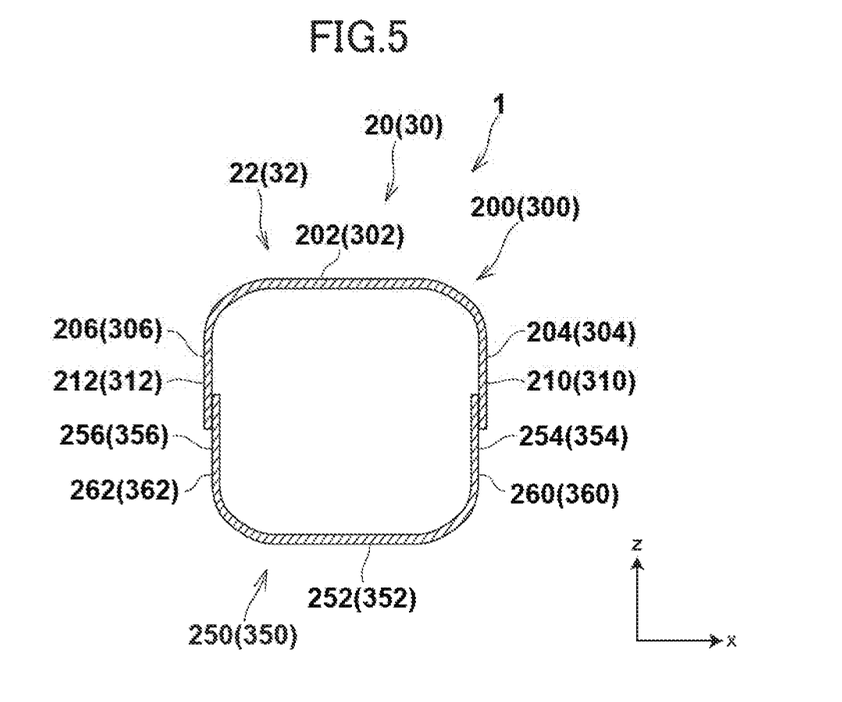
FIG. 5 is a cross-sectional view taken along a line B-B in FIG. 1.
Figure 6:
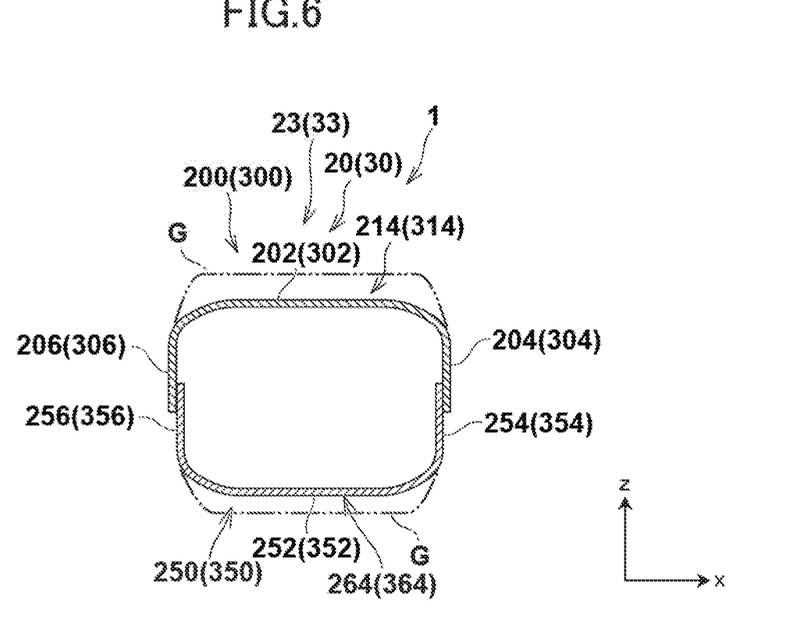
FIG. 6 is a cross-sectional view taken along a line C-C in FIG. 1.
Figure 7:
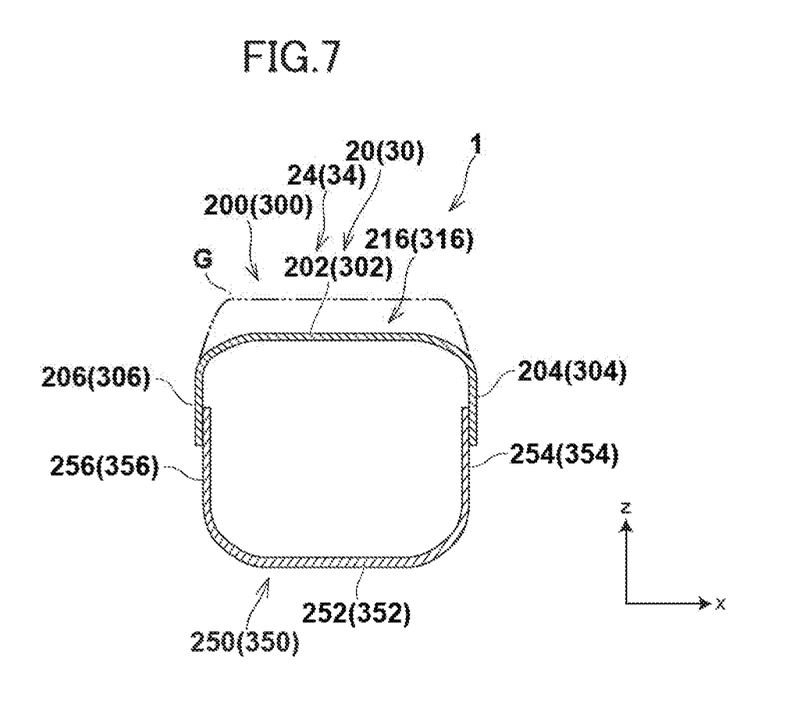
FIG. 7 is a cross-sectional view taken along a line D-D in FIG. 1.

FIGS. 1 to 3 are a plan view, a bottom view, and a left side view showing a configuration of a vehicle subframe according to the present embodiment, respectively. FIG. 4 is a cross-sectional view taken along a line A-A in FIG. 1, and is a longitudinal cross-sectional view taken along a plane parallel to a y-z plane formed by the y-axis and the z-axis. FIGS. 5 to 7 are cross-sectional views respectively taken along a line B-B, a line C-C, and a line D-D in FIG. 1, and are longitudinal cross-sectional views taken along planes parallel to an x-z plane formed by the x-axis and the z-axis. In FIGS. 3 to 7, a part of reference signs for constituent elements in a right-side portion of the vehicle subframe is written in parentheses together with a reference sign for a constituent element in a left-side portion as necessary, for convenience of description.

As shown in FIGS. 1 to 7, a subframe 1 is attached to a vehicle body such as a front side frame that defines a front bay of a vehicle such as an automobile, allows a driving source, which is typically an electric motor, for generating a driving force applied to driving wheels of the vehicle to be mounted thereon, and supports a suspension arm and the like, although illustrations are omitted. This sub frame 1 typically has a symmetrical (plane-symmetrical) configuration with respect to a plane that is parallel to a y-z plane and passes through a center line extending in a front-rear direction in the center in a width direction of the vehicle body.

In the subframe 1, six portions including a first vehicle-body attachment portion A1, a second vehicle-body attachment portion A2, a third vehicle-body attachment portion A3, a fourth vehicle-body attachment portion A4, a fifth vehicle-body attachment portion A5, and a sixth vehicle-body attachment portion A6 are arranged as portions attached to the vehicle body, four supporting portions including a first supporting portion S1, a second supporting portion S2, a third supporting portion S3, and a fourth supporting portion S4 are arranged as portions that support the suspension arm, and a driving-source supporting portion M1 is arranged as a portion that supports the driving source. Details of those portions will be described later.

Further, attachment portions that allow various external-force application parts to be attached are arranged in the subframe 1. Examples of those attachment portions are a steering-gear-box left attachment portion A7, a steering-gear-box right attachment portion A8, and a stabilizer attachment portion (not shown), details of which will be described later.

Specifically, the subframe 1 mainly includes a cross member 10, a pair of side members including a left side member 20 and a right side member 30, a left coupling member 40, a right coupling member 50, and a front coupling member 60. The cross member 10 is arranged to extend in the width direction and includes left and right extending portions that extend in the front-rear direction. The left side member 20 and the right side member 30 are arranged on the rear side of the cross member 10, extend in the front-rear direction, and are arranged to be opposed to each other in the width direction. The left coupling member 40 is arranged between the cross member 10 and the left side member 20 and couples them to each other. The right coupling member 50 is arranged between the cross member 10 and the right side member 30 and couples them to each other. The front coupling member 60 is arranged on the front side of the cross member 10 and couples the left and right extending portions of the cross member 10 to each other. These members are each typically obtained by shaping a flat-plate member such as a steel plate, or a cylindrical member made of steel or the like. Overlapped portions or butted portions are welded by arc welding or the like to be integrated with each other while being in contact with each other correspondingly, so that the subframe has a closed-section shape basically. Further, the cross member 10, the left coupling member 40, the right coupling member 50, and the front coupling member 60 may be collectively referred to as front members. It is possible that the cross member 10 and the left and right coupling members 40 and 50 are not obtained by integrating separate members prepared in advance with each other by arc welding or the like in a state where those correspond to each other. Alternatively, two press-formed products that are upper and lower products forming one pair may be integrated with each other by being welded by arc welding or the like, or those members may be manufactured by casting a metal material or the like. Further, the front coupling member 60 may be omitted if it is not required from a viewpoint of a part layout, the strength, or the like.

Specifically, the cross member 10 has a lateral portion 11 that extends in the width direction, a left front portion 12 that is located on the left front side of the lateral portion 11 and extends in the front-rear direction, a right front portion that is located on the right front side of the lateral portion 11 and extends in the front-rear direction, a left connecting portion 14 that connects a left end of the lateral portion 11 and a rear end of the left front portion 12 to each other in a connection shape including a smoothly curved shape, and a right connecting portion 15 that connects a right end of the lateral portion 11 and a rear end of the right front portion 13 to each other in a connection shape including a smoothly curved shape. That is, the cross member 10 is a member that is convex toward the rear side in a top view, defines an extending direction E that extends between a front end of the left front portion 12 and a front end of the right front portion 13 while being curved via the left connecting portion 14, the lateral portion 11, and the right connecting portion 15, and defines an inner region A surrounded by these portions. The driving source may be accommodated in this inner region A, or in the inner region A and a portion of a region on the rear side of the lateral portion 11 to be arranged over those regions. Further, an impact applied to a front end of the subframe 1 in frontal collision of a vehicle is distributed and transmitted to the lateral portion 11 and the left and right coupling members 40 and 50 via the left front portion 12 and/or the right front portion 13, and is then transmitted to the left and right side members 20 and 30 as front-rear direction components. Furthermore, a fragile portion that can be deformed by this impact is arranged in each of the left and right side members 20 and 30, but is not arranged in other members, that is, the cross member 10, the left coupling member 40, the right coupling member 50, and the front coupling member 60.

A left front attachment member 16 for attaching the subframe 1 to a front end of a left side frame of a vehicle body is arranged in the front end of the left front portion 12 of the cross member 10 and is connected thereto in a form of basically projecting to upper left. The left front attachment member 16 has a front-side member 162 and a rear-side member 164 arranged on the rear side of the front-side member 162. The front-side member 162 has a through hole 166 that vertically penetrates therethrough. Similarly, a right front attachment member 17 for attaching the subframe 1 to a front end of a right side frame of the vehicle body is arranged in the front end of the right front portion 13 of the cross member 10 in a form of basically projecting to upper right. The configuration related to the right front attachment member 17 is symmetrical with the configuration related to the left front attachment member 16 with respect to a plane that is parallel to a y-z plane and passes through the center line extending in the front-rear direction in the center in the width direction of the vehicle body, and therefore the detailed descriptions thereof are omitted. The right front attachment member 17 has a front-side member 172, a rear-side member 174, and a through hole 176 that respectively correspond to the front-side member 162, the rear-side member 164, and the through hole 166 of the left front attachment member 16. These members are each typically obtained by press-forming of one flat-plate member such as a steel plate to have a closed section shape, and are integrated with each other by being welded by arc welding or the like to correspond to each other. Alternatively, these members may be formed from a single plate member such as one steel plate or a cylindrical member made of steel or the like, not from two separate plate members such as steel plates, or may be manufactured by casting a metal material or the like.

The cross member 10 having the lateral portion 11, the left front portion 12, the right front portion 13, the left connecting portion 14, and the right connecting portion 15 is typically configured by an upper member 100 and a lower member 150 that are integrated with each other typically by being welded by arc welding or the like. The upper member 100 is a plate member such as a steel plate that extends in the extending direction E, is open on the front side of each of the left front portion 12 and the right front portion 13, and is convex upward as a whole. The lower member 150 is a plate member such as a steel plate that is arranged below the upper member 100 to be opposed thereto and extend in the extending direction E, and is convex downward as a whole, similarly to the upper member 100. The upper member 100 and the lower member 150 may be formed from a single cylindrical member made of steel or the like, not from two separate plate members such as steel plates, or may be manufactured by casting a metal material or the like at one time.

The upper member 100 has an upper wall portion 102, an inner wall portion 104 that continues to the upper wall portion 102 on the inner region A side and extends downward or obliquely downward, and an outer wall portion 106 that is located on the opposite side to the inner region A to be opposed to the inner wall portion 104, continues to the upper wall portion 102, and extends downward or obliquely downward. The outer wall portion 106 is provided with an outer flange 108 that extends from its lower end toward the opposite side to the inner region A. A base member 120 is arranged on the upper wall portion 102 in the lateral portion 11, which has a through hole 110 formed coaxially with a through hole (not shown) that vertically penetrates through the upper wall portion 102. The upper wall portion 102 in the left front portion 12 has a through hole 112 formed to penetrate therethrough vertically. The upper wall portion 102 in the right front portion 13 has a through hole 114 formed to penetrate therethrough vertically. Further, in FIG. 1, an R stop portion (an R stop line) on the right of a bending curve R at a boundary between the lateral portion 11 and the left connecting portion 14 in the outer wall portion 106 and an R stop portion (an R stop line) on the left of a bending curve R at a boundary between the lateral portion 11 and the right connecting portion 15 in the outer wall portion 106 are each representedly shown by a point with a numeral L on a boundary between the outer wall portion 106 and the outer flange 108.

The lower member 150 has a lower wall portion 152, an inner wall portion 154 that continues to the lower wall portion 152 on the inner region A side and extends upward or obliquely upward, an outer wall portion 156 that is located on the opposite side to the inner region A to be opposed to the inner wall portion 154, continues to the inner wall portion 154, and extends upward or obliquely upward, and an outer flange 158 that extends from an upper end of the outer wall portion 156 to the opposite side to the inner region A. In a top view, the inner wall portion 154 has an outer contour shape that is deviated with respect to the inner wall portion 104 of the upper member 100 toward the outer wall portion 156 by a distance equal to the plate thickness, and the outer wall portion 156 has an identical outer contour shape (that is a shape of a boundary between the outer wall portion 156 and the outer flange 158 in a section in which the outer wall portion 156 forms an inclined wall) to an outer contour shape of the outer wall portion 106 of the upper member 100 (that is a shape of a boundary between the outer wall portion 106 and the outer flange 108 in a section in which the outer wall portion 106 forms an inclined wall). In the lower wall portion 152 in the lateral portion 11, a through hole 160 into which a lower end of the base member 120 is inserted is formed to penetrate vertically through the lower wall portion 152. A collar member 190 having a through hole 182 that is coaxial with the through hole 112 in the upper wall portion 102 is arranged in the lower wall portion 152 in the left front portion 12. A collar member 192 having a through hole 184 that is coaxial with the through hole 114 in the upper wall portion 102 is arranged in the lower wall portion 152 in the right front portion 13. Further, the upper member 100 and the lower member 150 are integrated with each other by being welded by arc welding or the like at ends of overlapped portions of the inner wall portion 104 and the inner wall portion 154 on the side close to the inner region A and at ends of overlapped portions of the outer flange 108 and the outer flange 158 on the opposite side to the inner region A, so that the upper and lower members 100 and 150 define a closed section that is open in the left front portion 12 and the right front portion 13 but is closed in other portions. Furthermore, the position of an R stop portion (an R stop line) on the right of a bending curve R at a boundary between the lateral portion 11 and the left connecting portion 14 in the outer wall portion 156 and the position of an R stop portion (an R stop line) on the left of a bending curve R at a boundary between the lateral portion 11 and the right connecting portion 15 in the outer wall portion 156 are not shown in FIG. 2, but, in a top view, each of the positions is typically representedly shown by a point that is on the boundary between the outer wall portion 156 and the outer flange 158 and corresponds to the point L shown in FIG. 1 with regard to the outer wall portion 106.

The left front attachment member 16 is in contact with a left front end of each of the upper wall portion 102, the inner wall portion 104, and the outer wall portion 106 of the upper member 100 and the lower wall portion 152, the inner wall portion 154, and the outer wall portion 156 of the lower member 150 while closing an opening on the left front side of a closed section defined by these wall portions, and is integrated with these portions with which the left front attachment member 16 is in contact by being welded typically by arc welding or the like while being placed on a portion of a front end of the lower wall portion 152 of the lower member 150. Thus, the left front attachment member 16 may be regarded as a portion of the cross member 10. Such an integrated configuration is also established similarly as to the right front attachment member 17 that is in contact with right front ends of these wall portions.

Further, the front coupling member 60 is typically configured by a cylindrical member made of steel or the like. A bracket 64 of steel or the like with a through hole 62 formed therein and a bracket 68 of steel or the like with a through hole 66 formed therein are arranged on an upper surface of the front coupling member 60. The brackets 64 and 68 are welded to the upper surface of the front coupling member 60 by arc welding or the like and function as an attachment member for allowing a driving source to be accommodated in the inner region A defined by the subframe 1, for example, to be mounted on the subframe 1, together with the base member 120 arranged on the upper wall portion 102 in the lateral portion 11 of the cross member 10. A left end of the front coupling member 60 is welded by arc welding or the like while being nested in a right end of the left front attachment member 16, so that the left front attachment member 16 and the front coupling member 60 are integrated with each other. Such an integrated configuration is also established similarly as to the right front attachment member 17 having a left end into which a right end of the front coupling member 60 is nested. The left and right ends of the front coupling member 60 may correspond to the left front portion 12 and the right front portion 13 of the cross member 10, are connected thereto, and couple them to each other.

The left coupling member 40 typically defines an inner edge portion 41 that is a right edge in the width direction, a front end thereof being an inner front end portion P (shown in FIGS. 1 and 2) located to be closer to the center in the width direction than the R stop portion, and an outer edge portion 42 that is a left edge in the width direction in such a manner that the length in the lateral direction (the width in the width direction) decreases from the front to the rear on the rear side of the cross member 10, and has a front coupling portion 43F connected to a left rear end of the cross member 10 and a rear coupling portion 43R connected to a front end of the left side member 20. Also, the left coupling member 40 is configured by an upper member 400 and a lower member 450 that are integrated with each other by typically by arc welding or the like. The upper member 400 is a plate member such as a steel plate that is open on the sides in the forward-rear direction and is convex upward as a whole. The lower member 450 is a plate member such as a steel plate that is arranged below the upper member 400 to be opposed thereto and is convex downward as a whole, similarly to the upper member 400. Because the left coupling member 40 has a shape in which the length in the lateral direction (the width in the width direction) decreases from the front to the rear, the length in the lateral direction (the width in the width direction) of the front coupling portion 43F is arranged to be longer than the length in the lateral direction (the width in the width direction) of the rear coupling portion 43R. Further, the inner edge portion 41 of the left coupling member 40 reaches the lateral portion 11 in the outer wall portions 106 and 156 of the cross member 10, and the outer edge portion 42 of the left coupling member 40 reaches the left front portion 12 in the outer wall portions 106 and 156 of the cross member 10. Therefore, the left coupling member 40 is connected to the left front portion 12, the left connecting portion 14, and the lateral portion 11 of the cross member 10 in the left front coupling portion 43F, while covering the left connecting portion 14 of the cross member 10 in the width direction. Accordingly, it is possible to transmit an impact (a load) in collision applied to the left front portion 12 of the cross member 10 to the left side member 20 via the left connecting portion 14 and the left coupling member 40, and also to the right side member 30 via the left connecting portion 14, the lateral portion 11, the right connecting portion 15, and the right coupling member 50, and it is also possible to transmit an impact in collision applied to the right front portion 13 of the cross member 10 to the right side member 30 via the right connecting portion 15 and the right coupling member 50, and also to the left side member 20 via the right connecting portion 15, the lateral portion 11, the left connecting portion 14, and the left coupling member 40. Therefore, a load in collision applied to the cross member 10 can be transmitted to the left and right side members 20 and 30 while being appropriately distributed. The upper member 400 and the lower member 450 may be formed from a single plate member made of steel or the like, not from two separate plate members such as steel plates, or may be manufactured by casting a metal material or the like at one time.

The upper member 400 has an upper wall portion 402, an intermediate wall portion 406 that continues to the upper wall portion 402, extends obliquely downward, and extends to surround the upper wall portion 402 on both sides in the width direction and on the rear side, and a flange 408 that continues to a lower end of the intermediate wall portion 406, extends to the outside, and extends to surround the intermediate wall portion 406 on both sides in the width direction and on the rear side.

The lower member 450 has a lower wall portion 452, an intermediate wall portion 456 that continues to the lower wall portion 452, extends obliquely upward, and extends to surround the lower wall portion 452 on both sides in the width direction and on the rear side, and a flange 458 that continues to an upper end of the intermediate wall portion 456, extends to the outside, and extends to surround the intermediate wall portion 456 on both sides in the width direction and on the rear side.

The upper member 400 and the lower member 450 are integrated with each other by being welded by arc welding or the like at ends of overlapped portions of the flange 408 and the flange 458 except for the front ends and the rear ends of the upper and lower members 400 and 450, so that the upper and lower members 400 and 450 define a closed section that is open at the front and rear ends but is closed in other portions. Further, at the front ends of the upper and lower members 400 and 450, upper surfaces of each of the upper wall portion 402, the intermediate wall portion 406, and the flange 408 of the upper member 400 are welded to a lower surface of the outer flange 108 of the upper member 100 of the cross member 10 typically by arc welding or the like while being in contact therewith, and an upper surface of the lower wall portion 452 of the lower member 450 is welded to a lower surface of the lower wall portion 152 of the lower member 150 of the cross member 10 typically by arc welding or the like while being in contact therewith, so that the upper member 400 and the lower member 450 are integrated with the cross member 10 with the front and rear ends thereof closed. In this manner, a portion of the upper member 400 which is welded to the lower surface of the outer flange 108 of the upper member 100 of the cross member 10 while being in contact therewith and a portion of the lower member 450 which is welded to the lower surface of the lower wall portion 152 of the lower member 150 of the cross member 10 while being in contact therewith correspond to the front coupling portion 43F.

It is preferable that a left intermediate attachment member 44 for attaching the subframe 1 to an intermediate portion of a left side frame of a vehicle body is arranged on the upper surface of the upper wall portion 402 and the upper surface of the intermediate wall portion 406 of the upper member 400 to be arranged over those upper surfaces in a form in which the left intermediate attachment member 44 basically projects to upper left and overlaps the left connecting portion 14 in the width direction when viewed in the front-rear direction. Accordingly, the attaching strength and the attaching rigidity of the subframe 1 to the intermediate portion of the left side frame can be increased. The left intermediate attachment member 44 has a front inner member 442 and a rear inner member 444 arranged on the rear side of the front inner member 442. The left intermediate attachment member 44 further has an outer member 446 arranged on the left of the front inner member 442 and the rear inner member 444. A through hole 448 is formed in the rear inner member 444 and the outer member 446 to penetrate therethrough vertically. A peripheral portion on the left of the through hole 448 is cut out, so that a cutout portion C is formed. These members are each typically obtained by press-forming of one flat-plate member such as a steel plate, and are integrated with each other by being welded by arc welding or the like to correspond to each other. Alternatively, these members may be formed from a single plate member such as one steel plate, not from three separate plate members such as steel plates, or may be manufactured by casting a metal material or the like, as necessary. The cutout portion C functions as a fragile portion for releasing a fastener, for example, a bolt inserted through the through hole 448 from the through hole 448 by an impact applied to a front end of the subframe 1 and transmitted to the cutout portion C in frontal collision of a vehicle.

On the front side of the left intermediate attachment member 44, it is preferable that a left front supporting member 46 that defines an opening for allowing a portion of a left suspension member (not shown) to be mounted is arranged on an upper surface of a portion of the flange 458 of the lower member 450, which projects more to the left than the flange 408 of the upper member 400, in such a manner that the left front supporting member 46 overlaps the left connecting portion 14 in the width direction when viewed in the front-rear direction. Accordingly, the strength and rigidity for supporting the left suspension member can be increased. The left front supporting member 46 has a front member 462 that configures a front wall and an upper wall of that opening and a rear member 464 that is arranged on the rear side of the front member 462 and configures a rear wall of that opening. The rear member 464 is provided with a nut 466, and a through hole (not shown) is formed in the front member 462 and the rear member 464 to correspond to the nut 466. These members are each typically obtained by press-forming of one flat-plate member such as a steel plate, and are integrated with each other by being welded by arc welding or the like to correspond to each other. Alternatively, these members may be formed from a single plate member such as one steel plate, not from two separate plate members such as steel plates, or may be manufactured by casting a metal material or the like, as necessary.

The configuration related to the right coupling member 50, a right intermediate attachment member 54, and a right front supporting member 56 is symmetrical with the configuration related to the left coupling member 40, the left intermediate attachment member 44, and the left front supporting member 46 with respect to a plane that is parallel to a y-z plane and passes through the center line extending in the front-rear direction in the center in the width direction of the vehicle body, and therefore the detailed descriptions thereof are omitted. The right coupling member 50, the right intermediate attachment member 54, and the right front supporting member 56 have an inner edge portion 51, an outer edge portion 52, a front coupling portion 53F, a rear coupling portion 53R, an upper member 500, an upper wall portion 502, an intermediate wall portion 506, a flange 508, a lower member 550, a lower wall portion 552, an intermediate wall portion 556, a flange 558, a front inner member 542, a rear inner member 544, an outer member 546, a through hole 548, a cutout portion C of the through hole 548, a front member 562, a rear member 564, and a nut 566 that respectively correspond to the inner edge portion 41, the outer edge portion 42, the front coupling portion 43F, the rear coupling portion 43R, the upper member 400, the upper wall portion 402, the intermediate wall portion 406, the flange 408, the lower member 450, the lower wall portion 452, the intermediate wall portion 456, the flange 458, the front inner member 442, the rear inner member 444, the outer member 446, the through hole 448, the cutout portion C of the through hole 448, the front member 462, the rear member 464, and the nut 466.

The left side member 20 typically has a crushable portion that can be crushed and deformed in the front-rear direction by an impact that is applied to the front end of the subframe 1 and is transmitted to the left side member 20 in frontal collision of a vehicle, and a bendable portion that can be bent and deformed by that impact in a direction crossing the front-rear direction from the rear to the front, and is connected at its front end to the rear coupling portion 43R of the left coupling member 40. The left side member 20 typically includes a widened portion 21, a first fragile portion 22, a second fragile portion 23, and a third fragile portion 24 in this order from its rear end to the front. The widened portion 21 has a width that gradually increases toward the rear to be larger than the width of a general portion G of the left side member 20, and is for attaching the subframe 1 to a rear end of a left side frame of a vehicle body or a front lower portion of a cabin. The first fragile portion 22 is a portion from which the width of the widened portion 21 starts to increase toward the rear (a widening-start portion) and is a portion of start of crush deformation of the left side member 20 in the front-rear direction caused by a front-rear direction component of an impact applied to the front end of the subframe 1 and transmitted to the left side member 20 in frontal collision of a vehicle. The second fragile member 23 is for causing crush deformation of the left side member 20 that starts from the first fragile portion 22 to continuously occur. The third fragile portion 24 is a portion of start of bending deformation of the left side member 20 in the direction crossing the front-rear direction caused by the front-rear direction component of the impact applied to the front end of the subframe 1 and transmitted to the left side member 20 in frontal collision of the vehicle. A portion of the left side member 20, other than the widened portion 21, the first fragile portion 22, the second fragile portion 23, and the third fragile portion 24, is the general portion G that has a longitudinal section with a substantially constant area. From a viewpoint of surely receiving the impact applied to the front end of the subframe 1 and transmitted to the left side member 20 in frontal collision of the vehicle, it is preferable in the general portion G that the upper wall portion and the lower wall portion of the left side member 20 are parallel to an x-y plane and a left wall portion and a right wall portion of the left side member 20 are parallel to a y-z plane. From the viewpoint of surely receiving the impact applied to the front end of the subframe 1 and transmitted to the left side member 20 in frontal collision of the vehicle, it is preferable that the left side member 20 is in a range of the left front portion 12 of the cross member 10 when viewed in the front-rear direction. Further, from a viewpoint of achieving both the collision performance of the subframe 1 and the layout property of a suspension member, it is preferable that a supporting portion for allowing a portion of a left suspension member to be attached is arranged between the second fragile portion 23 and the third fragile portion 24.

The left side member 20 is configured by an upper member 200 and a lower member 250 that are integrated by being welded typically by arc welding or the like. The upper member 200 is a plate member such as a steel plate that is open on both the front side and the back side and is convex upward as a whole. The lower member 250 is a plate member such as a steel plate that is arranged below the upper member 200 to be opposed thereto and is convex downward as a whole, similarly to the upper member 200. The upper member 200 and the lower member 250 may be formed from a single cylindrical member of steel or the like, not from two separate plate members such as steel plates, or may be manufactured by casting a metal material or the like at one time.

The upper member 200 has an upper wall portion 202, an inner wall portion 204 that continues to the upper wall portion 202 on the right and hangs down from the upper wall portion 202, and an outer wall portion 206 that continues to the upper wall portion 202 on the left, hangs down from the upper wall portion 202, and is opposed to the inner wall portion 204 in the width direction. The lower member 250 has a lower wall portion 252, an inner wall portion 254 that continues to the lower wall portion 252 on the right and stands up from the lower wall portion 252, and an outer wall portion 256 that continues to the lower wall portion 252 on the left, stands up from the lower wall portion 252, and is opposed to the inner wall portion 254 in the width direction.

In the widened portion 21 of the upper member 200 of the left side member 20, a distance between the inner wall portion 204 and the outer wall portion 206 gradually increases toward the rear, so that the upper wall portion 202 is widened. In addition, a collar member 224 with a through hole 222 formed therein and a collar member 228 with a through hole 226 formed therein are arranged in the widened portion 21 in such a manner that the through holes 222 and 226 are coaxial with a through hole (not shown) that penetrates through the widened portion 21 vertically. In the widened portion 21 of the lower member 250 of the left side member 20, a distance between the inner wall portion 254 and the outer wall portion 256 gradually increases toward the rear, so that the lower wall portion 252 is widened. In addition, in the widened portion 21, a through hole 272 and a through hole 276 are formed to be respectively coaxial with the through hole 222 of the collar member 224 and the through hole 226 of the collar member 228. The forefront of the widened portion 21 is a portion at which the width of the widened portion 21 starts to increase toward the rear (a widening-start portion), and is represented as an inner widening-start portion 210 on the right and an outer widening-start portion 212 on the left in FIGS. 1 to 3 and 5. The inner widening-start portion 210 and the outer widening-start portion 212 are portions on which stress concentrates the most because of the impact applied to the front end of the subframe 1 and transmitted to the left side member 20 in frontal collision of the vehicle, because the width of the widened portion 21 increases to the rear and the widened portion 21 is attached and restricted to a rear end of a left side frame of a vehicle body and a front lower portion of a cabin at the positions of the through holes 222, 226, 272, and 276 located on the rear side of the inner widening-start portion 210 and the outer widening-start portion 212. Therefore, at this time, the inner widening-start portion 210 and the outer widening-start portion 212 each function as the first fragile portion 22 that is a portion of start of crush deformation of the left side member 20 in the front-rear direction because of the front-rear direction component of the impact transmitted to the left side member 20.

In the second fragile portion 23 adjacent to the first fragile portion 22 arranged to correspond to the inner widening-start portion 210 and the outer widening-start portion 212 on the front side of the first fragile portion 22, the upper wall portion 202 in the upper member 200 is dented downward to have a predetermined dent depth (a length in the vertical direction) as compared with that in the general portion G in the upper member 200, and the lower wall portion 252 in the lower member 250 is dented upward to have the same dent depth as the predetermined dent depth of the upper wall portion 202 as compared with that in the general portion G in the lower member 250, as shown in FIG. 6. In association with this configuration, in the second fragile portion 23, a distance between the upper wall portion 202 of the upper member 200 and the lower wall portion 252 of the lower member 250 (a distance in the vertical direction) is reduced equally on the upper and lower sides, as compared with that in the outer contour of the general portion G, so that the shape of the outer contour of the second fragile portion 23 forms a concave portion 214 and a concave portion 264, and the area of a longitudinal section of the left side member 20 taken along a plane parallel to an x-z plane is isotropically reduced in the vertical direction with respect to that of the general portion G. Because the concave portions 214 and 264 each have a longitudinal sectional shape that has the area isotropically reduced in the vertical direction, the concave portions 214 and 264 cause crush deformation induced by crush deformation of the left side member 20 started by the first fragile portion to occur continuously.

In the third fragile portion 24 arranged on the front side of the second fragile portion 23, the upper wall portion 202 in the upper member 200 is dented downward to have a predetermined dent depth (a length in the vertical direction) as compared with that in the general portion G in the upper member 200, as shown in FIG. 7. However, the lower wall portion 252 is not dented upward in the third fragile portion 24, unlike the second fragile portion 23. That is, in the third fragile portion 24, a distance between the upper wall portion 202 of the upper member 200 and the lower wall portion 252 of the lower member 250 (a distance in the vertical direction) is reduced by denting the upper wall portion 202 only, as compared with that in the outer contour of the general portion G, so that the shape of the outer contour of the third fragile portion 24 forms a concave portion 216, the area of a longitudinal section of the left side member taken along a plane parallel to an x-z plane is anisotropically reduced in the vertical direction with respect to that of the general portion G, and that area of the longitudinal section is arranged to be larger than the area of the longitudinal section of each of the first and second fragile portions 22 and 23. Because the concave portion 216 has a longitudinal sectional shape with the area that is anisotropically reduced in the vertical direction and is larger than that of each of the first and second fragile portions 22 and 23, bending deformation in which the lower member 250 is deformed to project downward is caused to occur after at least most of crush deformation of the left side member 20 is completed. Further, the lower member 250 has a shape obtained by vertically inverting the shape of the upper member 200 in which the width of the upper member 200 is reduced by its plate thickness on the left and right and the third fragile portion 24 is omitted. Further, the upper wall portion 202, the lower wall portion 252, the inner wall portion 204, the inner wall portion 254, the outer wall portion 206, and the outer wall portion 256 comprises flat wall portions except for the widened portion 21, the first fragile portion 22, the second fragile portion 23, and the third fragile portion 24.

In the left side member 20, through holes 230 and 232 and through holes 280 and 282 are formed typically between the second fragile portion 23 and the third fragile portion 24. The through holes 230 and 232 are formed in the upper wall portion 202 of the upper member 200 to penetrate therethrough vertically, and the through holes 280 and 282 are formed in the lower wall portion 252 of the lower member 250 to penetrate therethrough vertically and be coaxial with the through holes 230 and 232, respectively. Further, in the left side member 20, in the general portion G on the front side of the concave portion 216, front ends of the upper wall portion 202, the inner wall portion 204, and the outer wall portion 206 of the upper member 200 and front ends of the lower wall portion 252, the inner wall portion 254, and the outer wall portion 256 of the lower member 250 are connected to the rear coupling portion 43R of the left coupling member 40 by being welded by arc welding or the like. That is, in the left side member 20, those front ends are connected to the rear coupling portion 43R of the left coupling member 40 by being welded by arc welding or the like, while being inserted into an opening of a closed section formed by the upper wall portion 402, the intermediate wall portion 406, and the flange 408 of the upper member 400 and the lower wall portion 452, the intermediate wall portion 456, and the flange 458 of the lower member 450 in the rear end of the left coupling member 40.

Accordingly, it is possible to surely receive a load in collision that is appropriately distributed and transmitted to the left coupling member 40, by the left side member 20. In order to receive that load in collision by the left side member 20 more effectively, it is preferable that the rear end of the left coupling member 40 is connected to the left side member 20 while, in the rear end of the left coupling member 40, the rear end of the lower wall portion 452 of the lower member 450 projects more toward the rear than the rear end of the upper wall portion 402 of the upper member 400 in the opening of the closed section. This is because the load in collision input to the subframe 1 is transmitted mainly to a member located in a lower portion of the subframe 1 (the lower member 450 in the left coupling member 40).

The configuration related to the right side member 30 is symmetrical with the configuration related to the left side member 20 with respect to a plane that is parallel to a y-z plane and passes through the center line extending in the front-rear direction in the center in the width direction of the vehicle body, and therefore the detailed descriptions thereof are omitted. The right side member 30 has a widened portion 31, a first fragile portion 32, a second fragile portion 33, a third fragile portion 34, an upper member 300, a lower member 350, an upper wall portion 302, a lower wall portion 352, inner wall portions 304 and 354, outer wall portions 306 and 356, an inner widening-start portion 310, an outer widening-start portion 312, concave portions 314, 316, 364, and 366, through holes 322, 326, 330, 332, 372, 376, 380, and 382, and collar members 324 and 328 that respectively correspond to the widened portion 21, the first fragile portion 22, the second fragile portion 23, the third fragile portion 24, the upper member 200, the lower member 250, the upper wall portion 202, the lower wall portion 252, the inner wall portions 204 and 254, the outer wall portions 206 and 256, the inner widening-start portion 210, the outer widening-start portion 212, the concave portions 214, 216, 264, and 266, the through holes 222, 226, 230, 232, 272, 276, 280, and 282, and the collar members 224 and 228.

Among various points at which the subframe 1 is attached to a vehicle body in the above configuration, the through hole 166 provided in the front member 162 of the left front attachment member 16 corresponds to the left-front first vehicle-body attachment portion A1, the through hole 176 provided in the front member 172 of the right front attachment member 17 corresponds to the right-front second vehicle-body attachment portion A2, the through hole 448 provided in the rear inner member 444 and the outer member 446 of the left intermediate attachment member 44 corresponds to the left-intermediate third vehicle-body attachment portion A3, the through hole 548 provided in the rear inner member 544 and the outer member 546 of the right intermediate attachment member 54 corresponds to the right-intermediate fourth vehicle-body attachment portion A4, the through holes 222, 226, 272, and 276 and the collar members 224 and 228 provided in the widened portion 21 of the left side member 20 correspond to the left-rear fifth vehicle-body attachment portion A5, and the through holes 322, 326, 372, and 376 and the collar members 324 and 328 provided in the widened portion 31 of the right side member 30 correspond to the right-rear sixth vehicle-body attachment portion A6. All these portions are typically portions used for fastening with a fastening member such as a bolt. Further, an example is assumed in which a rigid structure without any subframe mounting member is employed for these portions. However, a floating structure using a subframe mounting member may be employed.

Among various portions in which the subframe 1 supports inner pivoting portions of a suspension arm, an opening defined by the front member 462 and the rear member 464 of the left front supporting member 46 and a through hole and the nut 466 provided therein correspond to the left-front first supporting portion S1, an opening defined by the front member 562 and the rear member 564 of the right front supporting member 56 and a through hole and the nut 566 provided therein correspond to the right-front second supporting portion S2, the through holes 230 and 232 provided in the upper wall portion 202 and the through hole 280 and 282 provided in the lower wall portion 252 of the left side member 20 correspond to the left-rear third supporting portion S3, and the through holes 330 and 332 provided in the upper wall portion 302 and the through hole 380 and 382 provided in the lower wall portion 352 of the right side member 30 correspond to the right-rear fourth supporting portion S4. All these portions are typically portions used for fastening with a fastening member such as a bolt. Further, an example is assumed in which an L-shaped lower arm is employed as the suspension arm applied to these portions. However, an A-shaped lower arm or two I-shaped lower arms may be employed. Furthermore, regarding the left-front first supporting portion S1 and the right-front second supporting portion S2, an example is assumed in which an inner cylinder of an insulator bush member (not shown) is fastened thereto. Regarding the left-rear third supporting portion S3 and the right-rear fourth supporting portion S4, an example is assumed in which a bracket is fastened thereto and the insulator bush member is attached to those brackets, although illustrations thereof are omitted.

Among various attachment portions at which various external-force application parts are attached to the subframe 1, the through hole 112 provided in the upper wall portion 102 and the through hole 182 and the collar member 190 provided in/on the lower wall portion 152 in the left front portion 12 of the cross member 10 correspond to a steering-gear-box left attachment portion A7, and the through hole 114 provided in the upper wall portion 102 and the through hole 184 and the collar member 192 provided in/on the lower wall portion 152 in the right front portion 13 of the cross member 10 correspond to a steering-gear-box right attachment portion A8. All these portions are typically portions used for fastening with a fastening member such as a bolt.

Furthermore, the through hole 110 and the base member 120 provided in/on the upper wall portion 102 and the through hole 160 provided in the lower wall portion 152 in the lateral portion 11 of the cross member 10, and the brackets 64 and 68 and the through holes 62 and 66 provided on/in the front coupling member 60 correspond to the driving-source supporting portion M1 in which the subframe 1 supports a driving source. All these portions are typically portions used for fastening with a fastening member such as a bolt. In addition, the though hole 110 and the base member 120 provided in/on the upper wall portion 102 in the lateral portion 11 of the cross member 10, used as the driving-source supporting portion M1, may be also used as a steering-gear-box rear attachment portion.

The subframe 1 according to the present embodiment described above is a vehicle subframe attached to a vehicle body of a vehicle, includes the cross member 10 that extends in the width direction of the vehicle body, is arranged on a front-side portion of the vehicle body in the front-rear direction, allows a driving source that generates a driving force for driving the vehicle to be mounted thereon, and has the left front attachment portion A1 to be attached to a left end in the width direction of the vehicle body and the right front attachment portion A2 to be attached to a right end in the width direction of the vehicle body, in the front-side portion, the left side member 20 that extends in the front-rear direction, is arranged in a left-side portion in the width direction, and has the left rear attachment portion A5 to be attached to the left end in the width direction of the vehicle body in a rear-side portion in the front-rear direction, the right side member 30 that extends in the front-rear direction, is arranged in a right-side portion in the width direction, and has the right rear attachment portion A6 to be attached to the right end in the width direction of the vehicle body in the rear-side portion in the front-rear direction, the left coupling member 40 that, to couple the cross member 10 and the left side member 20 to each other, has the left front coupling portion 43F that is an end on a side close to the cross member 10 and the left rear coupling portion 43R that has a shorter length in the width direction than a length in the width direction of the left front coupling portion 43F and is an end on a side close to the left side member 20, and the right coupling member 50 that, to couple the cross member 10 and the right side member 30 to each other, has the right front coupling portion 53F that is an end on the side close to the cross member 10 and the right rear coupling portion 53R that has a shorter length in the width direction than a length in the width direction of the right front coupling portion 53F and is an end on a side close to the right side member 30. The cross member 10 has the lateral portion 11 extending in the width direction, the left front portion 12 located on a side of the lateral portion 11 which is close to the left front attachment portion and extending in the front-rear direction, the right front portion 13 located on a side of the lateral portion 11 which is close to the right front attachment portion and extending in the front-rear direction to be opposed to the left front portion 12 in parallel thereto, the left connecting portion 14 connecting a left end in the width direction of the lateral portion 11 and a rear end in the front-rear direction of the left front portion 12 in a connection shape including a smoothly curved shape, and the right connecting portion 15 connecting a right end in the width direction of the lateral portion 11 and a rear end in the front-rear direction of the right front portion 13 in a connection shape including a smoothly curved shape. The left coupling member 40 is connected to the left front portion 12, the left connecting portion 14, and the lateral portion 11 of the cross member 10 in the left front coupling portion 43F while covering the left connecting portion 14 of the cross member 10 in the width direction. The right coupling member 50 is connected to the right front portion 13, the right connecting portion 15, and the lateral portion 11 of the cross member 10 in the right front coupling portion 53F while covering the right connecting portion 15 of the cross member 10 in the width direction. Therefore, to exhibit a required collision performance while the strength and rigidity of the entire subframe 1 are increased, it is possible to transmit an impact (a load) in collision applied to the left front portion 12 of the cross member 10 to the left side member 20 via the left connecting portion 14 and the left coupling member 40 and also to the right side member 30 via the left connecting portion 14, the lateral portion 11, the right connecting portion 15, and the right coupling member 50, and it is also possible to transmit an impact in collision applied to the right front portion 13 of the cross member 10 to the right side member 30 via the right connecting portion 15 and the right coupling member 50 and also to the left side member 20 via the right connecting portion 15, the lateral portion 11, the left connecting portion 14, and the left coupling member 40. Accordingly, it is possible to appropriately distribute and transmit a load in collision applied to the cross member 10 to the left and right side members 20 and 30.

Further, in the subframe 1 according to the present embodiment, the left side member 20 has a left front end opposed to the left rear attachment portion A5 in the front-rear direction, the right side member 30 has a right front end opposed to the right rear attachment portion A6 in the front-rear direction, the left coupling member 40 is connected to the left front end of the left side member 20 in the left rear coupling portion 43R while covering the left front end in the width direction, and the right coupling member 50 is connected to the right front end of the right side member 30 in the right rear coupling portion 53R while covering the right front end in the width direction. Therefore, it is possible to appropriately distribute and surely transmit the load in collision to the left and right side members 20 and 30.

Furthermore, in the subframe 1 according to the present embodiment, the left coupling member 40 has the left supporting member 46 that supports a left suspension member of the vehicle to overlap the left connecting portion 14 of the cross member 10 in the width direction when viewed in the front-rear direction, and the right coupling member 50 has the right supporting member 56 that supports a right suspension member of the vehicle to overlap the right connecting portion 15 of the cross member 10 in the width direction when viewed in the front-rear direction. Therefore, it is possible to increase the supporting strength and the supporting rigidity for the suspension members and to appropriately distribute and transmit the load in collision to the left and right side members 20 and 30.

In addition, in the subframe 1 according to the present embodiment, the left coupling member 40 has the left attachment member 44 in which the left intermediate attachment portion A3 to be attached to the left end in the width direction of the vehicle body is arranged at an intermediate position in the front-rear direction to overlap the left connecting portion 14 of the cross member 10 in the width direction when viewed in the front-rear direction, and the right coupling member 50 has the right attachment member 56 in which the right intermediate attachment portion A4 to be attached to the right end in the width direction of the vehicle body is arranged at an intermediate position in the front-rear direction to overlap the right connecting portion 15 of the cross member 10 in the width direction when viewed in the front-rear direction. Therefore, it is possible to increase the strength and the rigidity of attaching the subframe 1 to the vehicle body and to appropriately distribute and transmit the load in collision to the left and right side members 20 and 30.

In the present invention, the types, shapes, arrangements, numbers, and the like of the constituent members are not limited to those in the above embodiment, and it is needless to mention that the constituent elements can be modified as appropriate without departing from the scope of the invention, such as appropriately replacing these constituent elements with other members having equivalent operational effects.

As described above, in the present invention, it is possible to provide a vehicle subframe capable of appropriately distributing and transmitting a load in collision to exhibit a required collision performance while the strength and rigidity are increased. Therefore, because of its general purposes and universal characteristics, applications of the present invention can be expected in a wide range in the field of a subframe of a moving body such as a vehicle.

What is claimed is:

1. A vehicle subframe attached to a vehicle body of a vehicle, comprising:
   a cross member that extends in a width direction of the vehicle body, is arranged in a front-side portion of the vehicle body in a front-rear direction, allows a driving source that generates a driving force for driving the vehicle to be mounted thereon, and has a left front attachment portion to be attached to a left end in the width direction of the vehicle body and a right front attachment portion to be attached to a right end in the width direction of the vehicle body, in the front-side portion;
   a left side member that extends in the front-rear direction, is arranged in a left-side portion in the width direction, and has a left rear attachment portion to be attached to the left end in the width direction of the vehicle body in a rear-side portion in the front-rear direction;
   a right side member that extends in the front-rear direction, is arranged in a right-side portion in the width direction, and has a right rear attachment portion to be attached to the right end in the width direction of the vehicle body in the rear-side portion in the front-rear direction;
   a left coupling member that, to couple the cross member and the left side member to each other, has a left front coupling portion that is an end on a side close to the cross member and a left rear coupling portion that has a shorter length in the width direction than a length in the width direction of the left front coupling portion and is an end on a side close to the left side member; and
   a right coupling member that, to couple the cross member and the right side member to each other, has a right front coupling portion that is an end on the side close to the cross member and a right rear coupling portion that has a shorter length in the width direction than a length in the width direction of the right front coupling portion and is an end on a side close to the right side member,
   wherein
   the cross member has a lateral portion extending in the width direction, a left front portion located on a side of the lateral portion which is close to the left front attachment portion and extending in the front-rear direction, a right front portion located on a side of the lateral portion which is close to the right front attachment portion and extending in the front-rear direction to be opposed to the left front portion in parallel thereto, a left connecting portion connecting a left end in the width direction of the lateral portion and a rear end in the front-rear direction of the left front portion in a connection shape including a smoothly curved shape, and a right connecting portion connecting a right end in the width direction of the lateral portion and a rear end in the front-rear direction of the right front portion in a connection shape including a smoothly curved shape,
   the left coupling member is connected to the left front portion, the left connecting portion, and the lateral portion of the cross member in the left front coupling portion while covering the left connecting portion of the cross member in the width direction, and
   the right coupling member is connected the right front portion, the right connecting portion, and the lateral portion of the cross member in the right front coupling portion while covering the right connecting portion of the cross member in the width direction.

2. The vehicle subframe according to claim 1, wherein the left side member has a left front end opposed to the left rear attachment portion in the front-rear direction, the right side member has a right front end opposed to the right rear attachment portion in the front-rear direction, the left coupling member is connected to the left front end of the left side member in the left rear coupling portion while covering the left front end in the width direction, and the right coupling member is connected to the right front end of the right side member in the right rear coupling portion while covering the right front end in the width direction.

3. The vehicle subframe according to claim 1, wherein the left coupling member has a left supporting member that supports a left suspension member of the vehicle to overlap the left connecting portion of the cross member in the width direction when viewed in the front-rear direction, and the right coupling member has a right supporting member that supports a right suspension member of the vehicle to overlap the right connecting portion of the cross member in the width direction when viewed in the front-rear direction.

4. The vehicle subframe according to claim 1, wherein the left coupling member has a left attachment member in which a left intermediate attachment portion to be attached to the left end in the width direction of the vehicle body is arranged at an intermediate position in the front-rear direction to overlap the left connecting portion of the cross member in the width direction when viewed in the front-rear direction, and the right coupling member has a right attachment member in which a right intermediate attachment portion to be attached to the right end in the width direction of the vehicle body is arranged at an intermediate position in the front-rear direction to overlap the right connecting portion of the cross member in the width direction when viewed in the front-rear direction.

* * * * *